US009331883B1

(12) United States Patent
Schelstraete et al.

(10) Patent No.: US 9,331,883 B1
(45) Date of Patent: May 3, 2016

(54) WIRELESS HOME NETWORK SUPPORTING CONCURRENT LINKS TO LEGACY DEVICES

(71) Applicant: Quantenna Communications, Inc., Fremont, CA (US)

(72) Inventors: Sigurd Schelstraete, Menlo Park, CA (US); Hossein Dehghan, Diablo, CA (US)

(73) Assignee: Quantenna Communications, INC., Fremont, CA (US)

( * ) Notice: Subject to any disclaimer, the term of this patent is extended or adjusted under 35 U.S.C. 154(b) by 195 days.

(21) Appl. No.: 14/187,318

(22) Filed: Feb. 23, 2014

Related U.S. Application Data

(60) Provisional application No. 61/772,846, filed on Mar. 5, 2013.

(51) Int. Cl.
*H04H 20/71* (2008.01)
*H04L 27/26* (2006.01)

(52) U.S. Cl.
CPC .................................. *H04L 27/2626* (2013.01)

(58) Field of Classification Search
None
See application file for complete search history.

(56) References Cited

U.S. PATENT DOCUMENTS

| 7,661,038 | B2 * | 2/2010 | Li | H04L 1/0003 714/704 |
|---|---|---|---|---|
| 8,290,539 | B2 | 10/2012 | Li et al. | |
| 8,340,601 | B2 | 12/2012 | Gong et al. | |
| 9,071,299 | B1 * | 6/2015 | Schelstraete | H04B 7/0452 |
| 2006/0264184 | A1 * | 11/2006 | Li | H01Q 3/24 455/101 |
| 2007/0099578 | A1 * | 5/2007 | Adeney | H04B 7/0408 455/69 |
| 2008/0056414 | A1 * | 3/2008 | Kim | H04B 7/063 375/347 |
| 2008/0095110 | A1 * | 4/2008 | Montojo | H04L 5/0053 370/330 |
| 2008/0108310 | A1 * | 5/2008 | Tong | H04B 7/0617 455/69 |
| 2009/0238156 | A1 * | 9/2009 | Yong | H04B 7/0491 370/336 |
| 2009/0249151 | A1 * | 10/2009 | Zhou | H04B 7/061 714/748 |
| 2010/0142462 | A1 * | 6/2010 | Wang | H04B 7/024 370/329 |

(Continued)

OTHER PUBLICATIONS

Sigurd Schelstraete; "An Introduction to 802.11ac" White Paper Quantenna Communications, Inc., Sep. 2011.

(Continued)

*Primary Examiner* — Kwang B Yao
*Assistant Examiner* — Juvena Loo
(74) *Attorney, Agent, or Firm* — IP Creators; Charles C Cary

(57) ABSTRACT

A wireless access point (WAP) including: a station grouping module, a transmit selector, a spatial mapper, an output injector, and an input injector. The station grouping module selects a group of station nodes for concurrent MIMO communications. The transmit selector determines whether all station nodes in the group support a multi-user (MU) protocol. The spatial mapper precodes concurrent transmissions to the group using a precode matrix "Q" which spatially separates the concurrent MIMO transmissions to each station node in the group. The output injector injects preambles for synchronizing timing of the MIMO transmissions at the output of the spatial mapper, responsive to an affirmative determination by the transmit selector. The input injector injects preambles before precoding in the spatial mapper, responsive to a negative determination by the transmit selector; whereby transmission preambles are precoded when at least one station node in the group doesn't support the MU protocol.

17 Claims, 7 Drawing Sheets

WAP with Legacy Device
MU-MIMO Support

(56) References Cited

U.S. PATENT DOCUMENTS

| | | | |
|---|---|---|---|
| 2010/0142633 A1* | 6/2010 | Yu | H04B 7/0417 |
| | | | 375/260 |
| 2010/0166097 A1* | 7/2010 | Zhou | H04B 7/0452 |
| | | | 375/267 |
| 2011/0075752 A1* | 3/2011 | Zheng | H04B 7/0626 |
| | | | 375/267 |
| 2011/0142147 A1* | 6/2011 | Chen | H04L 25/03343 |
| | | | 375/260 |

OTHER PUBLICATIONS 802.11 Working Group; "IEEE P802.11AC/D1.0 Draft Standard for Information Technololoy—Telecommunications and Information Exchange between Systems—Part 11: Wireless LAN Medium Access Control (MAC) and Phycical Layer (PHY) specifications" May 2011.

D.Gesbert,M Kountouris,R.W.Heath, Jr., C.B.Chae, and T.Salzer, "From Single User to Multiuser Communications; Shifting the MIMO paradigm", IEEE Signal Processing Magazine, vol. 24, No. 5, pp. 36-46, Oct. 2007.

* cited by examiner

PRIOR ART: IEEE 802.11ac Wave 2 MU-MIMO

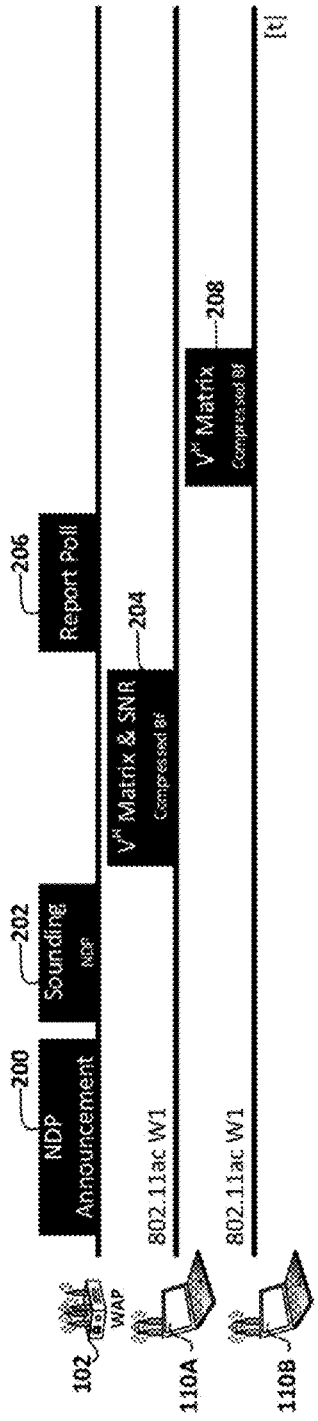
FIG. 2A   PRIOR ART:   MU-CHANNEL SOUNDING MU-MIMO IEEE 802.11ac Wave 2 MU-MIMO
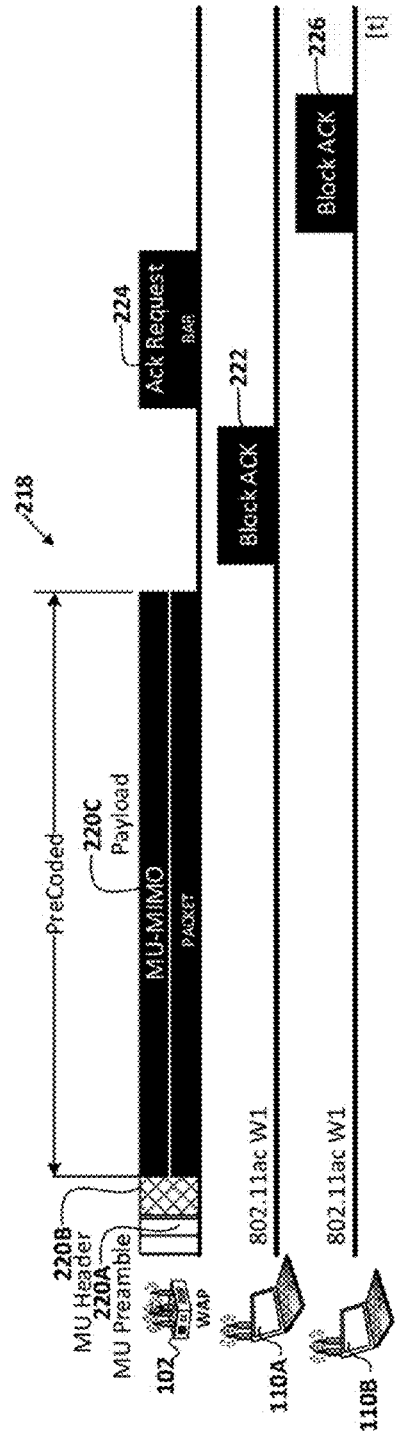
FIG. 2B   PRIOR ART:   MU-TRANSMISSION MU-MIMO IEEE 802.11ac Wave 2 MU-MIMO WAP with Legacy Device MU-MIMO Support

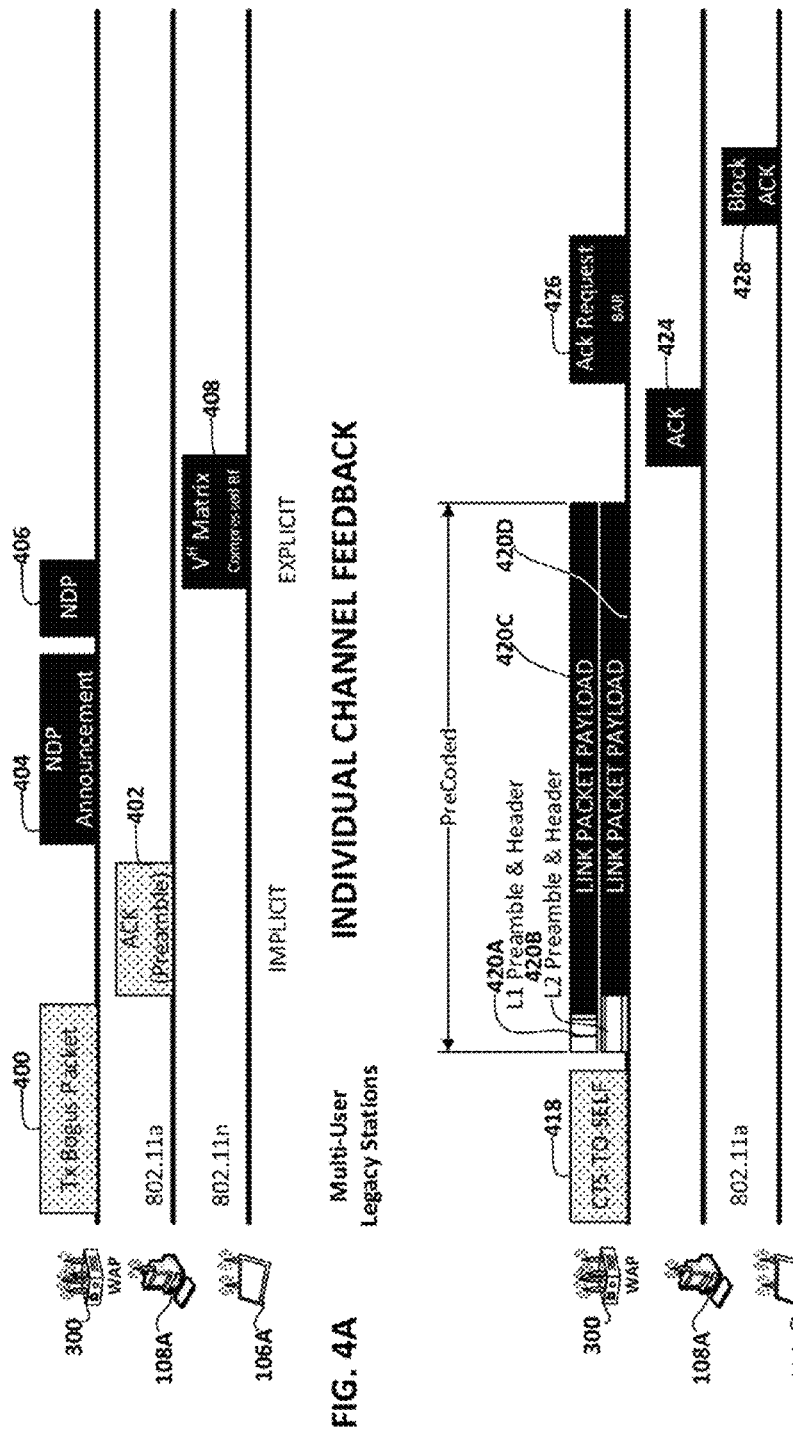

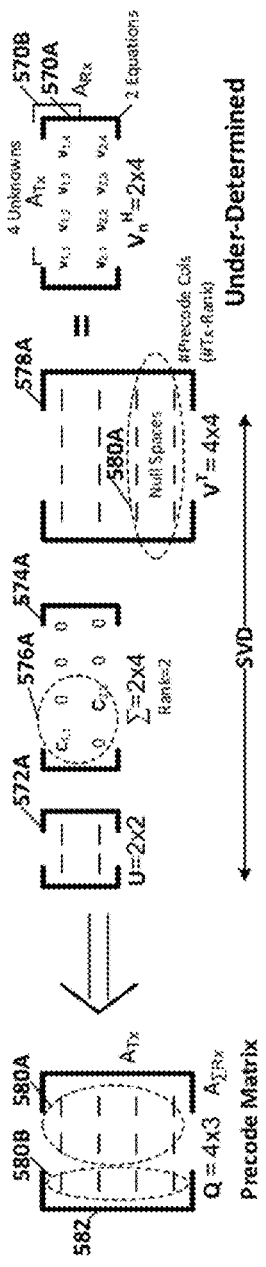
FIG. 5B
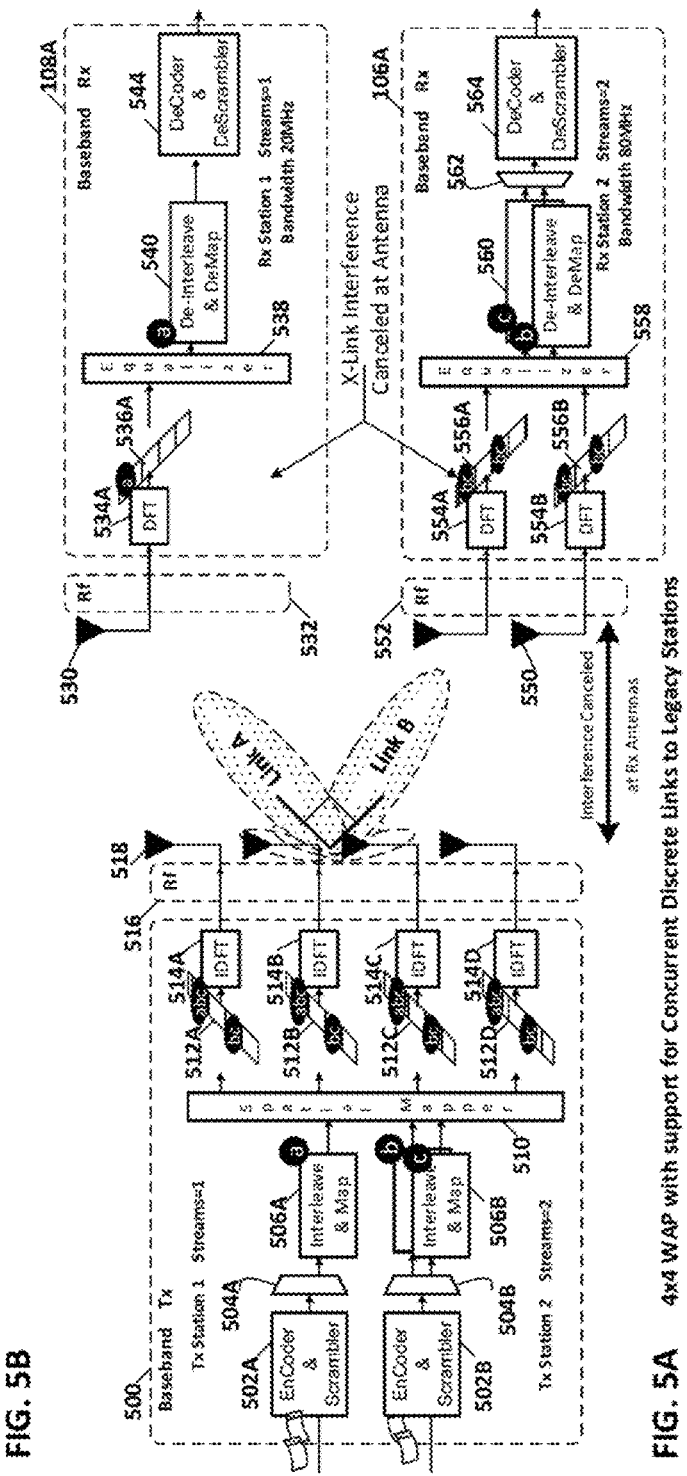
FIG. 5A  4x4 WAP with support for Concurrent Discrete Links to Legacy Stations

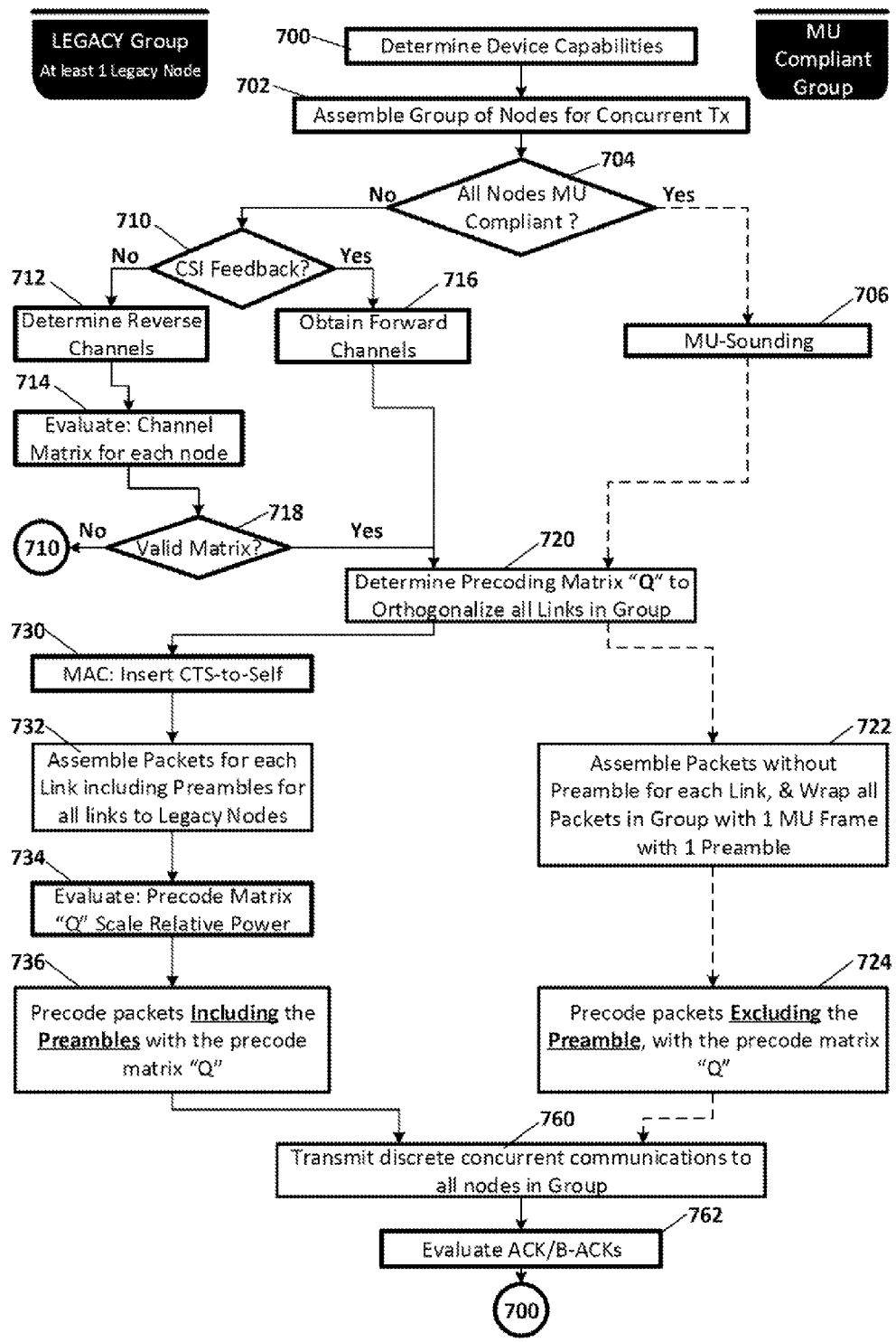
FIG. 7  DUAL MODE CONCURRENT LINK OPERATION

WIRELESS HOME NETWORK SUPPORTING CONCURRENT LINKS TO LEGACY DEVICES

CROSS REFERENCE TO RELATED APPLICATION

This application claims the benefit of prior filed Provisional Application No. 61/772,846 filed on Mar. 5, 2013 entitled "Multi-User MIMO with Legacy Clients" which is incorporated herein by reference in its entirety as if fully set forth herein.

BACKGROUND OF THE INVENTION

1. Field of Invention

The field of the present invention relates in general to wireless local area networks including wireless access points (WAP) and wireless stations and methods of multi-user concurrent communications with same.

2. Description of the Related Art

Home and office networks, a.k.a. wireless local area networks (WLAN) are established using a device called a Wireless Access Point (WAP). The WAP may include a router. The WAP wirelessly couples all the devices of the home network, e.g. wireless stations such as: computers, printers, televisions, digital video (DVD) players, security cameras and smoke detectors to one another and to the Cable or Subscriber Line through which Internet, video, and television is delivered to the home. Most WAPs implement the IEEE 802.11 standard which is a contention based standard for handling communications among multiple competing devices for a shared wireless communication medium on a selected one of a plurality of communication channels. The frequency range of each communication channel is specified in the corresponding one of the IEEE 802.11 protocols being implemented, e.g. "a", "b", "g", "n", "ac", "ad". Communications follow a hub and spoke model with a WAP at the hub and the spokes corresponding to the wireless links to each 'client' device.

After selection of a single communication channel for the associated home network, access to the shared communication channel relies on a multiple access methodology identified as Collision Sense Multiple Access (CSMA). CSMA is a distributed random access methodology first introduced for home wired networks such as Ethernet for sharing a single communication medium, by having a contending communication link back off and retry access to the line if a collision is detected, i.e. if the wireless medium is in use.

Communications on the single communication medium are identified as "simplex" meaning, one communication stream from a single source node to one or more target nodes at one time, with all remaining nodes capable of "listening" to the subject transmission. Starting with the IEEE 802.11ac standard and specifically 'Wave 2' thereof, discrete communications to more than one target node at the same time may take place using what is called Multi-User (MU) multiple-input multiple-output (MIMO) capability of the WAP. MU capabilities were added to the standard to enable the WAP to communicate with multiple single antenna single stream devices concurrently, thereby increasing the time available for discrete MIMO video links to wireless HDTVs, computers tablets and other high throughput wireless devices the communication capabilities of which rival those of the WAP.

Initially wireless home networks had limited indoor range and throughput of 20 feet and 1 Mbps respectively. As such they were limited to delivery of data, where inconsistencies in delivery, e.g. temporary outages or throughput shortfalls, are not noticeable. With improvements in range and throughput of 250 feet and 600 Mbps came the possibility of wireless delivery to low latency audio-video streams for consumer devices such as TVs. Each TV requires 5-30 Mbps in uninterrupted throughput for acceptable picture quality.

What is needed are improved methods for multi-user communication on the wireless home network.

SUMMARY OF THE INVENTION

The present invention provides a method and apparatus for a wireless access point (WAP) apparatus to expand multi-user communication groups to include legacy stations which do not support the IEEE 802.11ac (Wave 2) standard.

In an embodiment of the invention a WAP having a plurality of antennas and supporting multiple-input multiple-output (MIMO) wireless communications with associated station nodes on a selected one of a plurality of orthogonal frequency division multiplexed (OFDM) communication channels is disclosed. The WAP comprises: a station grouping module, a transmit selector, a spatial mapper, an output injector, and an input injector. The station grouping module is configured to select a group of at least two of the associated station nodes for concurrent MIMO communication links with the WAP. The transmit selector is configured to determine whether all station nodes in the group support a multi-user (MU) protocol. The spatial mapper includes an input and an output, and is configured to precode concurrent transmissions to the selected group at the input using a precode matrix "Q" which spatially separates the concurrent MIMO transmissions to each station node in the group at the output. The output injector couples to the output of the spatial mapper and is configured to inject preambles for synchronizing timing of the MIMO transmissions at the output of the spatial mapper, responsive to an affirmative determination by the transmit selector. The input injector couples to the input of the spatial mapper and is configured to inject preambles before precoding in the spatial mapper, responsive to a negative determination by the transmit selector; whereby transmission preambles are precoded when at least one station node in the group does not support the MU protocol.

The invention may be implemented in hardware, firmware or software.

Associated methods and computer readable media containing program instructions are also claimed.

BRIEF DESCRIPTION OF THE DRAWINGS

These and other features and advantages of the present invention will become more apparent to those skilled in the art from the following detailed description in conjunction with the appended drawings in which:

FIGS. 2A-B are packet timing diagrams for a Prior Art multi-user (MU) channel sounding and MU transmission respectively of the wireless home network shown in FIGS. 1A-C;

FIGS. 4A-B are packet timing diagrams for obtaining channel information from and transmitting data concurrently to legacy devices shown in FIGS. 3A-C, in accordance with an embodiment of the invention;

FIGS. 5A-B are respectively a system layout and associated matrix processing view of an embodiment of the invention which allows concurrent communication with legacy devices;

FIG. 7 is a process flow diagram of processes associated with concurrent links to legacy and MU compliant devices, in accordance with an embodiment of the current invention.

DETAILED DESCRIPTION OF THE EMBODIMENTS

The present invention provides a method and apparatus for increasing the types of devices that can be included in multi-user (MU) multiple-input multiple-output (MIMO) transmission groups to include legacy devices that do not support the IEEE 802.11ac (Wave 2) MU-MIMO protocol.

MU-MIMO is a technique whereby multiple independent transmissions are sent simultaneously to a number of receivers. The transmissions are precoded in such a way that the respective receive signals are free of mutual interference. Precoding coefficients are chosen in such a way that interference is eliminated at the antennas of the different receivers. Stations eligible for inclusion in a group must support the IEEE 802.11ac (Wave 2) specification, and the MU protocol set forth therein. This constraint severely limits the number of stations which can be included in multi-user groups and excludes billions of existing wireless devices which only support one or more of prior wireless standards, such as: IEEE 802.11 "a", "b", "g", "n" and "ac (Wave 1)".

Figure 1A:
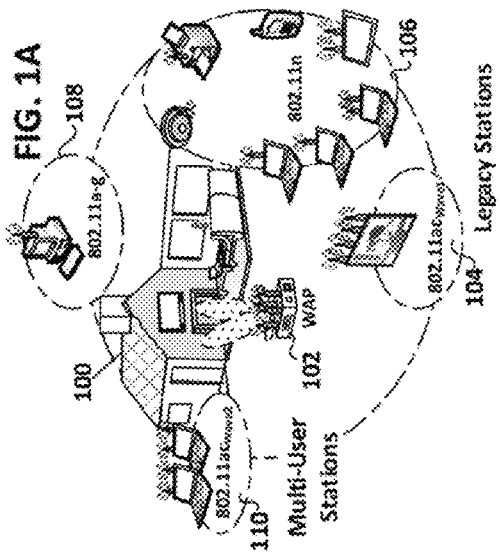
FIGS. 1A-C are respectively a system view, a timing diagram, and a bandplan of a Prior Art wireless home network exhibiting limited support for multi-user (MU) multiple-input multiple-output (MIMO) wireless communications.
Figure 1B:
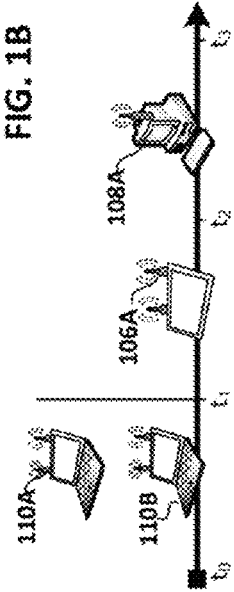
Figure 1C:
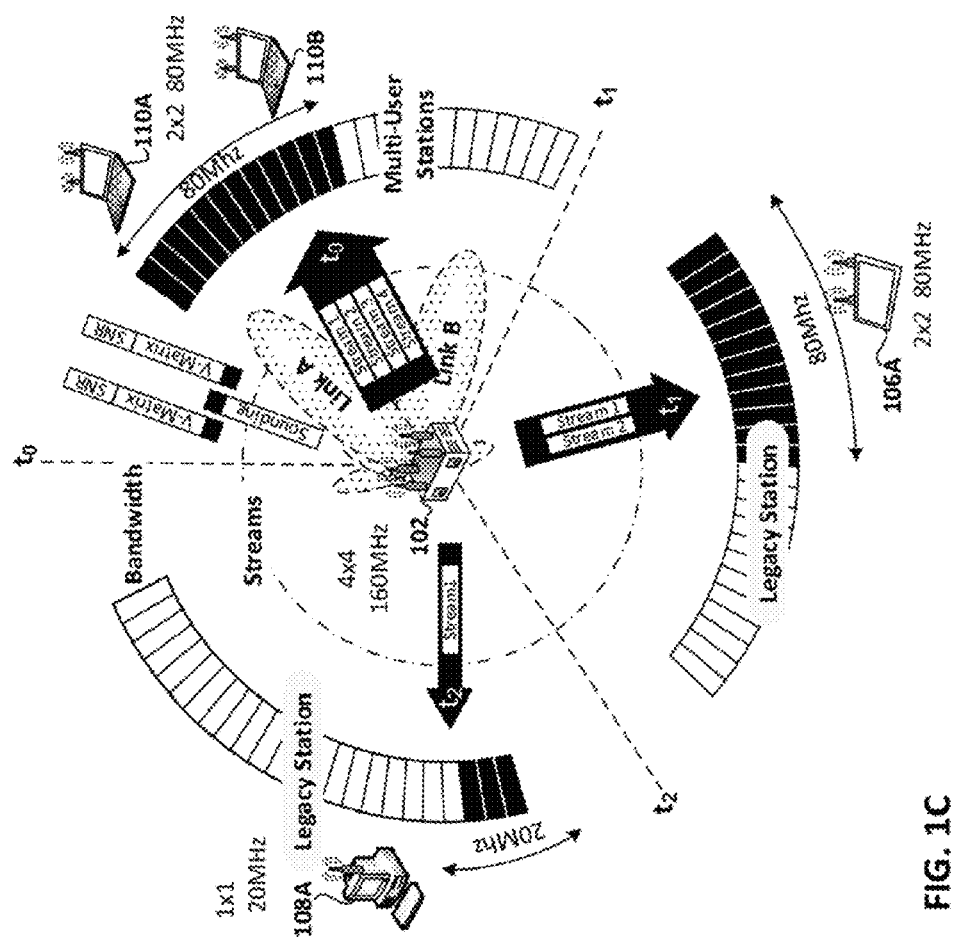

FIGS. 1A-C are respectively a system view, a timing diagram, and a bandplan of a Prior Art wireless home network exhibiting limited support for MU MIMO wireless communications. Prior Art MU MIMO as implemented in the IEEE 802.11ac standard and specifically 'Wave 2' thereof, is intended to enable the WAP to communicate with multiple single antenna single stream devices concurrently, thereby increasing the time available for discrete MIMO video links to wireless HDTVs, computers tablets and other high throughput wireless devices the communication capabilities of which rival those of the WAP 102. This prior art case is shown in FIG. 1A-C. FIG. 1A is a system view of WAP 102 servicing multiple wireless devices/stations in a home 100. Legacy stations, i.e. those that do not support the IEEE 802.11ac (Wave 2) standard. Three legacy station types are shown. The first type of legacy stations 108 are those which only support one or more of the IEEE 802.11 "a", "b" or "g" standards. The second type of legacy stations 106 are those which only support IEEE 802.11 "n" or prior standards. The third type of legacy stations 104 are those which only support IEEE 802.11 "ac" (Wave 1) or prior standards. Although these legacy devices do support broadcast of the same content to multiple recipients, i.e. Multicast transmission, none of them support concurrent discrete transmissions to multiple stations. The only stations 110 that are able to support MU-MIMO are those that are compliant with the IEEE 802.11ac (Wave 2) standard.

In FIG. 1B, WAP 102 is shown transmitting concurrent discrete communications with notebook computers 110A, 110B in the same time interval, $t_0$-$t_1$. Both computers 110A, 110B are compliant with the IEEE 802.11ac (Wave 2) wireless communication standard including support for MU sounding and framing. The prior art WAP 102, lacks support for concurrent communications with legacy devices, and thus communicates serially with these legacy devices. In successive time intervals $t_1$-$t_2$ and $t_2$-$t_3$ the prior art WAP 102 communicates serially with legacy devices 106A, 108A respectively.

As shown in FIG. 1C, 802.11ac (Wave 2) compliant devices 110A-110B can be aggregated into an MU-MIMO group with a concomitant reduction in airtime usage resulting from the ability of the WAP to concurrently rather than serially transmit discrete data to two or more such devices in an MU group. The notebook computers 110A, 110B in the MU-MIMO group serviced in time interval $t_0$-$t_1$ are shown as 2×2 devices meaning they have two antennas and internally support up to two transport streams. Each is shown as having the same maximum bandwidth, e.g. 80 MHz. Any devices participating in a prior art MU-MIMO group are subject to an initial MU channel sounding from the WAP and response from each targeted user device in which indicia for the associated channel are returned, i.e. the $V^H$ matrix and Signal-to-Noise Ratios (SNR).

If the event stations in a prior art MU-MIMO group did not have matching bandwidths, the bandwidth, under the IEEE 802.11ac (Wave 2) standard is limited to that of the group member with the narrowest bandwidth. In other words, if one MU-MIMO group member supported 20 MHz and the others 160 MHz the maximum bandwidth for MU-MIMO under the IEEE 802.11ac (Wave 2) standard would be 20 MHz because the MU Frame header specified in that standard only has one bandwidth field for indicating the common bandwidth to all stations in the MU-MIMO group.

In the example shown in FIG. 1C, communications to legacy stations 106A and 108A can not take place concurrently due to the lack of support for the IEEE 802.11ac (Wave 2) MU-MIMO protocol. Thus they are communicated with sequentially in time intervals $t_1$-$t_2$ and $t_2$-$t_3$ respectively rather than concurrently. Communications with legacy station 106A in time in interval $t_1$-$t_2$ spans 80 MHz which is the maximum bandwidth for legacy station 106A. Communications with legacy station 108A in time in interval $t_2$-$t_3$ spans 20 MHz which is the maximum bandwidth for legacy station 108A.

FIGS. 2A-B are packet timing diagrams for a Prior Art multi-user (MU) channel sounding and MU transmission respectively of the wireless home network shown in FIGS. 1A-C. In FIG. 2A sounding with Prior Art MU-MIMO compliant devices requires only an initial Null Data Packet (NDP) announcement 200 and a single MU compliant Sounding 202 from WAP 102. The NDP announcement indicates what stations are in the MU Group and which among them is the Primary Station. The sounding contains a signal sequence known to both MU-MIMO compliant WAP and all receiving stations/devices in the prospective MU-MIMO group.

Upon receipt of the single MU-MIMO sounding from the WAP, the primary station recipient 110A analyzes the received signal resulting from the known sounding sequence sent by the WAP and determines the alterations to the sounding sequence brought about by the scattering, fading, and attenuation of the wireless communication medium between the WAP and the subject station. The receiving primary station characterizes these alterations into what is known as a channel matrix "H" with row and column dimensions corresponding to the number or transmit and receive antennas respectively. The MU-MIMO compliant primary receiver then performs a singular value decomposition (SVD) of the channel matrix H and determines the resultant $V^H$ matrix which is a unitary square matrix with row and column dimensions each corresponding to the number of transmit antennas. The superscript "$H$" is the Hermitian, a.k.a. conjugate transpose. The primary MU receiving station transmits a sounding response 204 containing $V^H$ and per tone signal-to-noise ratio (SNR) to the transmitting WAP so that the WAP can determine the channel between it and the primary receiver.

All other stations, e.g. station 110B, in the MU group have already made their own channel characterizations and calculated their own sounding responses. As per the MU-MIMO protocol they each wait for a discrete report poll 206 from the WAP and responsive thereto deliver their own sounding response 208, e.g. $V^H$ and per tone SNR from station 110B to WAP 102.

After the WAP has received all prior art MU-MIMO compliant sounding responses it computes a precoding matrix "Q" which is used to modify the subsequent MU-MIMO transmission to multiple target stations so that they arrive at each station without interference from the signals going to other stations in the MU-MIMO group.

In FIG. 2B a MU-MIMO compliant frame 218 is shown being sent by WAP 102. The MU-MIMO frame includes: a single preamble 220A, a single Header 220B and a payload 220C. The preamble is a known sequence which allows all receiving stations to synchronize reception. Additionally, the MU preamble and header are not precoded so they are heard by all stations in the network including the MU-MIMO compliant stations in the transmission group and the legacy stations which are not. Thus medium access control (MAC) during prior art MU-MIMO transmission requires only this single MU-MIMO compliant frame header to reserve, pursuant to the carrier sense multiple access (CSMA) protocol, access to the network for the WAP during the transmission to the MU-MIMO compliant stations.

The MU header also communicates information to the stations in the MU Group. The MU header contains the MU-MIMO group ID, primary station, and per user information such as: modulation and coding scheme (MCS) and number of streams for each prior art MU-MIMO user/device/station. The payload 220C of the MU frame contains discrete packets for each MU-MIMO compliant station in the group. There is no preamble on any of these packets. Timing synchronization is handled by the single preamble in the MU-MIMO frame header. The payload 220C is precoded with the precode matrix to avoid interference between other stations in the group at each receiving station.

The primary station 110A immediately after receipt of its discrete transmission from the WAP, sends a block acknowledgement (ACK) 222 to the WAP to confirm receipt. Each remaining station in the MU-MIMO group, e.g. Notebook 110B, sends its own discrete acknowledgement, e.g. 226, only in response to a discrete acknowledgement request, a.k.a. ACK request, from the WAP, e.g. ACK request 224.

Figure 3A:
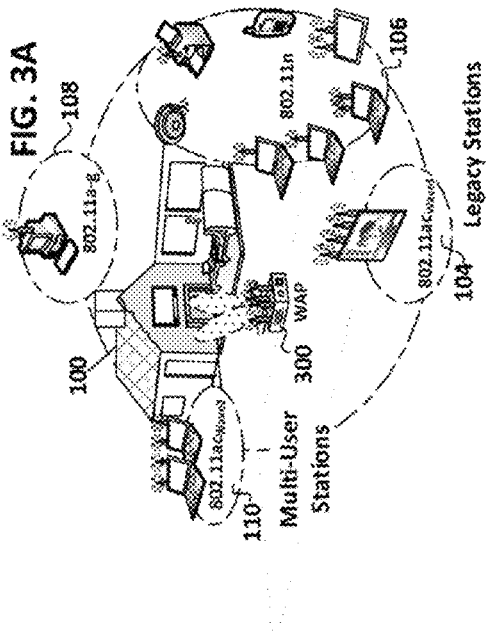
FIGS. 3A-C are respectively a system view, a timing diagram, and a bandplan of a wireless home network in accordance with an embodiment of the invention which expands the types of stations which can be included in discrete concurrent MIMO communication groups including legacy devices which do not support the MU protocol.
Figure 3B:
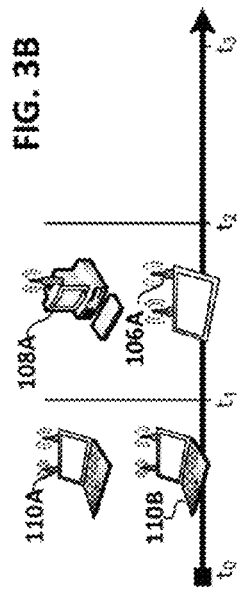
Figure 3C:
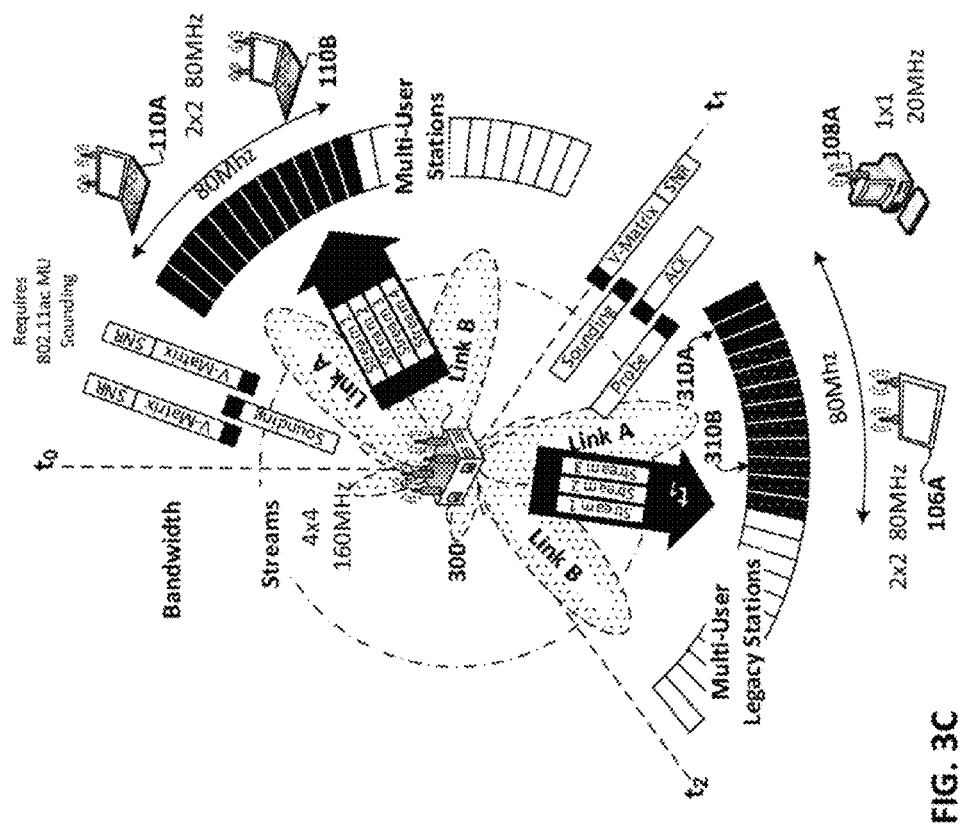

FIGS. 3A-C are respectively a system view, a timing diagram, and a bandplan of a wireless home network in accordance with an embodiment of the invention which expands the types of stations which can be included in discrete concurrent MIMO communication groups to include legacy devices which do not support the MU protocol set forth in IEEE 802.11ac (Wave 2) for wireless local area networks (WLAN).

In contrast to the prior art MU-MIMO case shown in FIGS. 1A-C the WAP 300 with dual mode concurrent link support shown in this embodiment of the invention can form multi-user groups from either or both MU-MIMO compliant devices as well as non MU-MIMO compliant devices, a.k.a. legacy devices. As discussed above, most wireless devices found in home networks are legacy devices which do not support the MU-MIMO protocol specified in IEEE 802.11ac (Wave 2). The current invention allows these devices to be targets of discrete concurrent communications, thus greatly improving overall network throughput by allowing all stations to be prospective targets for discrete concurrent links with the WAP.

FIG. 3A is a system view of WAP 102 servicing multiple wireless devices/stations in a home 100. Legacy stations, i.e. those that do not support the IEEE 802.11ac (Wave 2) standard are broken down into the types, 104, 106, 108 discussed above with respect to FIG. 1A. Although these legacy devices do support broadcast of the same content to multiple recipients, i.e. multicast transmission, none of them support concurrent discrete transmissions to multiple stations. The only stations 110 that are able to support MU-MIMO are those that are compliant with the IEEE 802.11ac (Wave 2) standard.

FIG. 3B shows the bandwidth and streams and time intervals associated with the WAP 300 which supports dual mode concurrent links with either or both legacy and MU-MIMO compliant devices. In time interval $t_0$-$t_1$ the WAP 300 transmit discrete concurrent communications to MU MIMO compliant notebook computers 110A-B followed by discrete concurrent communications in time interval $t_1$-$t_2$ to the legacy devices 106A, 108A which do not support MU-MIMO as set forth in IEEE 802.11ac (Wave 2).

As shown in FIG. 3C all wireless devices whether or not they are compliant with IEEE 802.11ac (Wave 2) can be aggregated groups for concurrent discrete links with the dual mode concurrent link WAP 300. The notebook computers 110A, 110B in the MU-MIMO group serviced in time interval $t_0$-$t_1$ are shown as 2×2 devices meaning they have two antennas and internally support up to two transport streams. Each is shown as having the same maximum bandwidth, e.g. 80 MHz. These wireless notebook computers are subject to an initial MU channel sounding from the WAP and provide individual sounding responses with the indicia of the associated channel there between, i.e. the $V^H$ matrix and Signal-to-Noise Ratios (SNR).

The next concurrent grouping is of legacy stations 106A, 108A which don't support the MU-MIMO standard. The legacy stations also have different bandwidth support. The maximum bandwidth supported by legacy station 106A is 80 MHz. The maximum bandwidth supported by legacy station 108A is 20 MHz. The legacy stations also have different sounding support. Neither station supports a concurrent sounding, since they are not MU-MIMO compliant. Although Legacy station 106A does not support the IEEE 802.11ac (Wave 2) standard, it does support point-to-point sounding, as specified in IEEE 802.11n. Legacy station 108A has no sounding support since it is only compliant with the IEEE 802.11b standard.

In spite of these infirmities, the dual mode WAP 300 establishes concurrent discrete links with these legacy stations in time interval $t_1$-$t_2$. After a discrete sounding to get the forward channel information from wireless tablet device 106A the WAP obtains reverse channel information from wireless computer 108A and transposes this to obtain forward channel information. The dual mode WAP then uses this channel information for each link to compute a precode matrix for both links to assure that the discrete concurrent communications to each of these devices will not interfere with one another. The dual mode WAP precodes the 20 MHz overlapping communication bandwidth 310A over which it establishes discrete links to both devices 106A, 108A and avoids precoding the remaining 60 MHz communication bandwidth 310B devoted exclusively to the communication link to tablet 106A. Thus the dual mode WAP of the current invention can use asymmetric bandwidths for concurrent links to wireless devices unlike the prior art design, which is limited to the bandwidth of the narrowest bandwidth member of the group.

FIGS. 4A-B are packet timing diagrams for obtaining channel information from and transmitting data concurrently to legacy devices in a wireless home network as shown in FIGS. 3A-C, in accordance with an embodiment of the invention. In FIG. 4A channel probing with legacy devices requires a determination by the dual mode concurrent link WAP 300 of the current invention as to the capabilities of each of the legacy devices in a group. In the example shown neither station in the group supports a concurrent sounding, since neither is MU-MIMO compliant.

Legacy station 108A has no sounding support since it is only compliant with the IEEE 802.11b standard. WAP 300 obtains reverse channel information from the legacy station, by sending a packet 400 with bogus content to station 802.11a and analyzes the known preamble in the receipt acknowledgement ACK 402 therefrom. WAP 300 transposes the reverse channel matrix it determines based on the received ACK and converts this to a forward channel estimate "H" by transposing the reverse channel matrix. An SVD of the forward channel matrix by the WAP 300 results in the unitary square $V^H$ matrix from the null-space rows of which the relevant columns of the precode matrix "Q" can be calculated by the WAP.

The next legacy station 106A in the group is then subject to channel probing. Although legacy station 106A does not support the IEEE 802.11ac (Wave 2) standard, it does support point-to-point sounding, as specified in IEEE 802.11n. A Null Data Packet (NDP) announcement 404 followed by a NDP packet 406 are sent to legacy station 106A. Upon receipt of the discrete MIMO sounding from the WAP, station 106A analyzes the received signal resulting from the known sounding sequence sent by the WAP and determines the alterations to the sounding sequence brought about by the scattering, fading, and attenuation of the wireless communication medium between the WAP and itself. The station characterizes these alterations into what is known as a channel matrix "H" with row and column dimensions corresponding to the number or transmit and receive antennas respectively. The receiving station then performs a singular value decomposition (SVD) of the channel matrix H and determines the resultant $V^H$ matrix which is a unitary square matrix with row and column dimensions each corresponding to the number of transmit antennas. The superscript "$^H$" is the Hermitian, a.k.a. conjugate transpose. The primary MU receiving station transmits a sounding response 408 containing $V^H$ and the average signal-to-noise ratio (SNR) to the WAP 300 so that the WAP can determine the channel between it and the primary receiver.

The WAP performs an SVD on the sounding response from station 106A resulting in the unitary square $V^H$ matrix from the null-space rows of which the relevant remaining columns of the precode matrix "Q" can be calculated by the WAP. The precoding matrix "Q" is used to modify the subsequent discrete concurrent MIMO transmission to target stations 106A and 108A so that they arrive at each station without interference from the signals going to other station(s) in the MIMO group.

In FIG. 4B the sequence associated with a transmission of discrete data concurrently to each member of the group is shown. To control access to the wireless communication medium the WAP 300 sends a CTS-to-Self packet 418 which is specified in the IEEE 802.11g standard. The CTS-to-Self packet dears the communication medium for a specified amount of time required for the WAP to transmit the following discrete concurrent data packets to each link. These communication packets are precoded in their entirety, including the time synchronizing preamble portions thereof. This feature is required to avoid interference at each receiving station from the preambles associated with the packets sent to other stations in the group. Thus each receiving station only 'hears' its own preamble. This is critical where the receiving stations are of different legacy types, e.g. IEEE 802.11a type and IEEE 802.11n type each of which has a different preamble. There is a discrete communication packet for each target station in the group. Two packets are shown. The first includes a preamble and header 420A and a payload 420C. The second includes a preamble and header 420B and a payload 420D. As discussed above, these are precoded in their entirety with the precode matrix "Q" so that they each arrive at the antennas of their associated receiving station without interference from the packets sent concurrently to other members of the group. At the expiration of the access clearing interval specified in the CTS-to-Self packet station 108A sends out an ACK packet confirming receipt of the associated one of the concurrent communication packets from the WAP. Because this station does not support delayed acknowledgment, it will send its acknowledgement immediately after receipt. The other member of the group, i.e. tablet 106A supports the IEEE 802.11n standard which allows for a delayed acknowledgment provided such policy is set in the header 420B of the corresponding packet. Once the delay bit is set the compliant recipient station 106A waits for an ACK request 426 from the WAQP 300, upon receipt of which it acknowledges packet receipt in the form of a block ACK packet 428.

FIGS. 5A-B are respectively a system layout and associated matrix processing view of an embodiment of the invention which allows concurrent communication with legacy devices.

FIG. 5A shows WAP 500 transmitting concurrently to a legacy group comprising stations 106A and 108A. The WAP has four antenna 518. Station 106A has two antenna 550 and a supported bandwidth of up to 80 MHz. Station 108A has one antenna 530 and a supported bandwidth of 20 MHz. In WAP 500 communications for user/station 108A are encoded and scrambled in encoder scrambler module 502A and maintained as a single stream by demultiplexer 504A. The stream "a" is subject to interleaving and constellation mapping in an associated interleaver mapper 506A and passed to the spatial mapper 510. Communications for user/station 106A are encoded and scrambled in encoder scrambler module 502B and de-multiplexed into two streams in demultiplexer 504B. Each stream "c", "d" is subject to interleaving and constellation mapping in an associated interleaver mapper 506B and passed to the spatial mapper 510. The spatial mapper uses a precoding matrix "Q" to precode the streams to each user so that they will arrive at their target stations antenna(s) without interference from one another.

In the example shown in FIG. 5A the bandwidths of the concurrent communications to stations 106A, 108A only partially overlap. Station 108A only supports a 20 MHz communication whereas station 106A supports an 80 MHz communication bandwidth. Thus precoding to avoid mutual interference is only required on the overlapping portion of the bandwidths, e.g. the lower 20 MHz of the orthogonal frequency division multiplexed (OFDM) tones at the input of each of the four inverse discrete Fourier transform modules 514A-D. The combined precoded streams for both stations 106A, 108A are injected into the lower ones of OFDM tones 512A-D spanning 20 MHz at the input of each of the four IDFT modules. The adjacent 60 MHz worth of OFDM tones 510A-D at the input of each of the four IDFT modules are devoted exclusively to the communications with station 106A. At the output of each IDFT the concurrently transmitted packets to each link are upconverted in Rf stage 516 and for transmission by each of the WAP's four antenna 518.

The signals received at the antenna 530 of station 108A are free from interference from the communications to station 106A and vice versa. In station 108A the received communication "a" on the antenna are downconverted in Rf stage 532 and transformed from the time to the frequency domain in discrete Fourier Transform module 534A from which they are output as discrete orthogonal frequency division multiplexed (OFDM) tones/sub-carriers/sub-channels 536A. The received stream is then subject to equalization in equalizer 538 implementing either linear or non-linear equalization. Received steam "a" is subject to de-interleaving and constellation demapping in associated deinterleaver demapper module 540, followed by decoding and descrambling in decoder descrambler 544.

The signals received at the antenna 550 of station 106A are also free from interference from the communications to station 108A due to the precoding of the communications in the overlapping portions of the communication bandwidth In station 106A the received communications "bc" on each of the two antenna 550 are downconverted in Rf stage 552 and transformed from the time to the frequency domain in discrete Fourier Transform modules 554A-B from which they are output as discrete orthogonal frequency division multiplexed (OFDM) tones/sub-carriers/sub-channels 556A-B. All received streams are then subject to equalization in equalizer 558 implementing either linear or non-linear equalization. Received steams "bc" are subject to de-interleaving and constellation demapping in associated deinterleaver demapper modules 560, followed by multiplexing in multiplexer 562. The received data "bc" is decoded and descrambled in decoder descrambler 564.

As shown in FIG. 5B the WAP 500 calculates the precode matrix used in the spatial mapper 510 using the forward and reverse channel feedback 570A, 570B from the receiving stations, obtained during channel probing by the WAP, as discussed above in connection with FIG. 4A. The matrices are said to be under-determined since the number of unknowns exceeds the number of equations. The WAP performs a singular value decomposition (SVD) of the VH matrix received from station 106A, and a transposition of the reverse channel matrix determined from the ACK preamble sent by station 108A, followed by an SVD. The WAP 500 extracts the corresponding column of the precode matrix "Q" from each SVD.

The first of these two SVD's is shown in FIG. 5B. An SVD is performed on "$V^{H}$" matrix 570A the $U\Sigma V^T$ matrices 572A, 574A, 578A respectively are obtained. Sigma has a rank of 2 with non-zero diagonal terms 576A on the first two columns only. The null spaces in V transpose correspond to the last two rows 580A thereof. After transpose these become the associated columns 580A of the precode matrix 582. The remaining column 580B of the precode matrix "Q" result from a transpose followed by a similar SVD on the reverse channel estimate 570B obtained other station's receipt acknowledgment packet.

Precoding:

In precoding the design criteria for $Q_i$ is such that the received signals are free of interference at the receive antenna of the corresponding device, and hence before any equalization has been performed in the baseband portion of the receiver. A precoded transmission of three concurrent packets for three users can be written as:

$$Tx = Q_1 X_1 + Q_2 X_2 + Q_3 X_3 \quad (1)$$

where $Q_i$ are the pre-equalization precoding coefficients and $X_i$ represents the data for $i^{th}$ user.

The pre-equalized precoded signal as received at each of the receivers is expressed as:

$$Rx_1 = H_1(Q_1 X_1 + Q_2 X_2 + Q_3 X_3)$$

$$Rx_2 = H_2(Q_1 X_1 + Q_2 X_2 + Q_3 X_3)$$

$$Rx_3 = H_3(Q_1 X_1 + Q_2 X_2 + Q_3 X_3) \quad (2)$$

The design criteria for $Q_i$ is such that the received signals are free of interference at the respective antenna(s) of each station. In (2) for instance, $Rx_1$ (received signal for user 1) contains terms $H_1 Q_2 X_2$ and $H_1 Q_3 X_3$, which represent interference from the second and third user. The condition for eliminating the interference for user 1 is to choose $Q_i$ such that $H_1 Q_2 = H_1 Q_3 = 0$.

To cancel all mutual interference, the prior art pre-equalization constraints on $Q_i$, the $i^{th}$ column of Q are that:

$$H_1 Q_2 = H_1 Q_3 = 0$$

$$H_2 Q_1 = H_2 Q_3 = 0$$

$$H_3 Q_1 = H_3 Q_2 = 0 \quad (3)$$

In such a case, the received signal at the first receiver does not contain any contribution from the signals intended for STA2 and STA3. Likewise, the received signal at the second receiver does not contain any contribution from the signals intended for STA1 and STA3 and the received signal at the third receiver does not contain any contribution from the signals intended for STA1 and STA2.

The main challenge is the construction of suitable precoding coefficients $Q_i$ that actually meet the conditions. One well-known technique is based on the existence of null-spaces for the respective channels. A null space of a matrix is the ensemble of vectors that is mapped to zero when multiplied with the matrix. In other words, a vector X≠0 is in the null space of the matrix M if M·X=0.

These constraints may alternately be expressed in terms of the channel indicia received from each station eligible for a MU group. Given the SVD decomposition for each of the channels: $H_i = U_i \Sigma_i V_i^+$, (3) is equivalent to:

$$V_1^+ Q_2 = V_1^+ Q_3 = 0$$

$$V_2^+ Q_1 = V_2^+ Q_3 = 0$$

$$V_3^+ Q_1 = V_3^+ Q_2 = 0 \quad (4)$$

where the '+' operator is the conjugate transpose, a.k.a. Hermitian. Only the V-matrix in the channel sounding response packet from a station in the group or a transpose of the reverse channel estimate of the link from a station in the group is needed to solve these equations.

Figure 6:
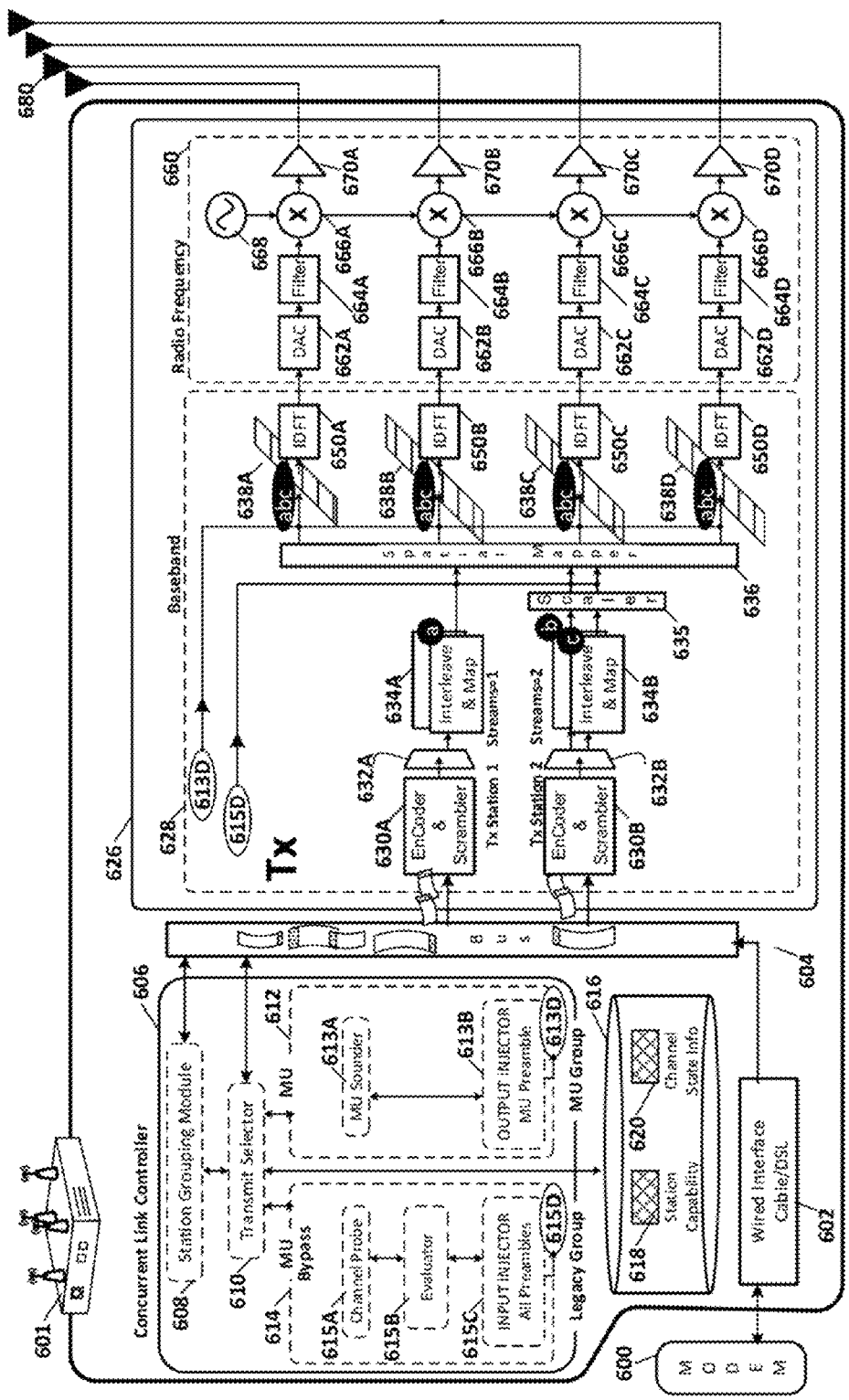
FIG. 6 is a hardware block diagram of a WAP supporting discrete concurrent MIMO communications to groups of stations including legacy devices, in accordance with an embodiment of the invention.

FIG. 6 is a hardware block diagram of a WAP supporting discrete concurrent MIMO communications with legacy devices/stations which do not support the MU-MIMO protocol, in accordance with an embodiment of the invention. The WAP 601 in this embodiment of the invention is identified as a 4×4 WAP supporting as many as 4 discrete communication streams over four antennas 680. It couples to the Internet via an integral wired interface 602 to a cable or digital subscriber line (DSL) modem 600. A packet bus 604 couples the modem to the MIMO wireless stage 626. The wireless stage includes a baseband module 628 and a radio frequency module 660 coupled to antennas 680. In FIG. 6 only the transmit components of the baseband and Rf portions of the WAP are shown. The WAP however has a full and complementary set of receive path components and operates for transmitting and receiving communications from all associated wireless stations on its network.

In the baseband portion 628 communications for each user/station are processed. In the embodiment shown two concurrent communications comprising 2+1=3 three streams are being processed for concurrent delivery of discrete communication packets to two stations/users. Processing varies depending on whether the receiving stations in the group all support the MU-MIMO standard or have one or more members which do not support the MU-MIMO standard.

The baseband portion 628 of the WAP is dynamically configurable to support sequential communications to a single station or concurrent MIMO communications to groups of 2-4 users/stations, regardless of the support of those stations for the MU-MIMO protocol. The communications "a" to the $1^{st}$ of the two users are encoded and scrambled in encoder scrambler module 630A and passed through de-multiplexer 632A as a single stream. Stream "a" is subject to interleaving and constellation mapping in an associated interleaver mapper 634A and passed to the spatial mapper 636. Communications for the 2 user/station are encoded and scrambled in encoder scrambler module 630B and de-multiplexed into two streams in demultiplexer 632B. Each stream "b, c" is subject to interleaving and constellation mapping in an associated interleaver mapper 634B and passed to the spatial mapper 636 after any required scaling in scaler 635. The spatial mapper precodes the discrete communications so they arrive at their discrete destinations without interference from each other. The combined precoded streams are injected into all OFDM tones 638A-D of the four inverse discrete Fourier Transform (IDFT) modules 650A-D respectively for Radio Frequency (Rf) upconversion in Rf stage 660 and for transmission by each of the WAP's four antenna 518.

The Rf stage includes 4 transmit chains each with their own digital-to-analog converters 662A-D, filters 664-D, upconverters 666A-D and power amplifiers 670A-D. Each of the four transmit chains couples to a corresponding one of the WAP's four antenna 680. A common oscillator 668 drives the upconverters 668A-D.

The WAP 601 also includes a concurrent link controller 606 coupled to storage 616. The WAP supports both sequential communications to one link at a time or concurrent discrete communications to multiple links at one time. This controller is active when the WAP is handling concurrent discrete MIMO communication links. The concurrent link controller includes: a station grouping module 608, a transmit selector 610, a MU-MIMO module 612 and a MU-MIMO bypass module 614. Processing of discrete concurrent links by the controller varies depending on whether the receiving stations in the group all support the MU-MIMO standard or have one or more members which do not support the MU-MIMO standard.

In operation the station grouping module selects at least two of the associated station nodes for discrete concurrent MIMO communication links with the WAP. The station grouping module 608 determines the capabilities of each station in the group and stores the capabilities of each station 618 in memory 616. Capabilities include for example: which of the IEEE 802.11 . . . standards each station supports, along with the supported bandwidth, streams and antenna of each station. The transmit selector 610 determines whether or not all stations in the group support the MU-MIMO protocol set forth in IEEE 802.11ac (Wave 2).

If all stations in the group support the MU-MIMO protocol then control is passed to the MU-MIMO module 612. Stations are sounded with a single sounding initiated by MU sounder 613A. Then the precoding matrix "Q" determined therefrom is determined and sent to the spatial mapper 636 for precoding all concurrent transmissions to the selected station nodes in the MU group so that there is no mutual interference at the receive antenna(s) of each station in the group. The output injector 613B injects the timing synchronizing preamble 613D portion of the MU-MIMO frame at the output of the spatial mapper 636, thereby avoiding precoding of the preamble thereof. Because the preamble is not precoded, it can be heard by all stations on the network thus serving reserving the communication medium.

Alternately, if one or more stations in the group don't support the MU-MIMO protocol then control is passed to the MU-MIMO bypass module 614. The channel prober 615A probes each station node in the group to determine the wireless channel information for each prospective link, including obtaining reverse channel estimates for stations that do not support explicit channel sounding.

In an embodiment of the invention the evaluator 615B evaluates the reliability of channel information obtained by the prober from stations in the group that do not support explicit channel sounding. The evaluator compares throughput to the station nodes with and without MIMO beamforming using a steering matrix derived from the channel information. If beamformed throughput is not significantly better then the throughput without beamforming, then the associated steering matrix and the reverse channel information on which it is based is deemed unreliable. A station subject to an unreliable evaluation is either subject to channel re-estimation or is ejected from the group.

In another embodiment of the invention the evaluator 615B evaluates the precode matrix "Q". The evaluator coupled to scaler 635 gradually scales the input from one of the channels to the spatial mapper. This is equivalent to scaling the relative power of the link relative to remaining links in the group. If throughput to remaining stations in the group is degraded as the power is scaled to one of the group, then the precoding matrix is deemed unreliable. A precoding matrix which is deemed unreliable is either re-determined or the group itself is disbanded in favor of another group of stations or a return to sequential communications with each station individually.

Next the input injector 615C injects timing synchronizing preambles into the concurrent communication packets at the input of the spatial mapper 636, thereby subjecting the preambles to precoding in the spatial mapper. Because the preambles are precoded, they can't be heard by other stations in the group and thus will not interfere with their receive timing synchronization. The discrete preambles match the selected one of the IEEE 802.11a, b, g, n, and ac 'Wave 1' standards supported by each station node.

In a further embodiment of the invention in which the group includes one legacy station which does not support the MU-MIMO protocol and two or more stations that do, a single MU-MIMO frame and associated single IEEE 802.11ac (Wave 2) preamble are used to synchronize timing on the two or more MU-MIMO compliant stations and discrete preambles are injected for remaining legacy stations which do not. In this embodiment of the invention all preambles, including the MU-MIMO preamble are injected at the input of the spatial mapper and are all subject to precoding so that they do not interfere with the reception of the legacy ones of the stations in the group.

In an alternate embodiment of the invention the preambles of all packets for legacy or MU-MIMO compliant stations are assembled prior to scrambling and encoding and tracked at each step of the baseband processing for inclusion or exclusion of therefrom as required. In this embodiment of the invention the timing synchronizing preambles of any group which includes at least one legacy station are included in the precoding of the spatial mapper. Alternately, if all members of a group are MU-MIMO compliant, then the preamble is excluded from precoding in the spatial mapper.

FIG. 7 is a process flow diagram of processes associated with concurrent links to legacy and MU compliant devices, in accordance with an embodiment of the current invention. Processing begins in process 700 with a determination of device capabilities by the WAP for all stations in the network, via for example a capabilities exchange. This allows the WAP to identify numerous communication parameters for each station, including the version of the IEEE 802.11 standard supported thereby, the number of streams and antennas on each station as well as whether the station supports MU-MIMO soundings. Next in process 702 the WAP determines which if any stations to place in a group for concurrent discrete communications with the two or more stations/users/devices/nodes thereof. Next, in decision process 704 a determination is made for the subject group as to whether all nodes/stations in the group are MU-MIMO compliant.

If the stations in the group are all MU-MIMO compliant a affirmative determination is reached and control passes to process 706. In process 706 a MU-MIMO compliant channel sounding is conducted and the sounding response in the form of the $V^H$ and per tone SNR matrices from each station in the group are obtained. Next in process 720 the matrices associated with the sounding responses are used to determine the precode matrix "Q" to orthonalize all communication links in the group so that upon receipt at each station they do not interfere with one another. Next in process 722 the single MU-MIMO frame with the single preamble and header, and the payload with the packets for each member in the group, without preambles, are assembled. Control is then passed to process 724 in which the payload portion of the MU-MIMO frame and the packets for each link therein are precoded with the precode matrix "Q", and the preamble and header for the MU-MIMO frame are not precoded. Control is then passed to process 760 for transmission of the MU-MIMO frame of the MU compliant discrete concurrent communications to all members of the MU compliant group. The receiving stations all synchronize timing using the common un-precoded preamble, and each then processes the associated precoded packet in the payload without, thanks to precoding, any interference from the other packets in the payload. Finally, receipt acknowledgment packets i.e. block ACKS are used by the WAP to confirm a successful transmission after which control returns to process 700.

If the stations in the group are not all MU-MIMO compliant a negative determination is reached and control passes to process 710. In decision process 710 a determination is made for each station node in the group as to whether they support explicit CSI feedback or not. If they do, control is passed to process 716. In process 716 each such channel is subject to a sounding and the sounding response containing the specific CSI feedback for the forward channel between the WAP and each station is determined. A legacy group may from time to time include in addition to at least one legacy device, more than one station which does support the MU-MIMO protocol. In this instance a MU-MIMO sounding may be used to obtain the channel state information (CSI) from this portion of the group, with remaining legacy station(s) probed discretely. After probing obtain the forward channel information, control is then passed to process 720.

Where the subject station does not support explicit CSI feedback, control is passed to process 712. In process 712 the reverse channel is determined by the WAP sending a communication packet with bogus data to the target station. Upon receipt of the ACK the WAP, using the known preamble in the acknowledgement "ACK" packet and alterations thereto brought about by the scattering, fading and attenuation of the reverse channel, determines the reverse channel matrix the transpose of which is the estimated forward channel. Next in process 714 each channel matrix is evaluated by comparing the throughput improvement with and without beamforming. Throughput improvement may exhibit itself as either or both a reduction in bit error rate (BER) or an increase in the modulation and coding scheme (MCS) which the beamformed channel can support. If there is no throughput improvements the beamforming steering matrix and the channel matrix from which it is derived is deemed unreliable and in decision process 718 the subject device is either subject to another round of reverse channel probing or is removed from the concurrent communication group. When a matrix is deemed reliable, control is passed to process 720.

In process 720 the matrices associated with the forward and reverse channel probing are used to determine the precode matrix "Q" to orthonalize all communication links in the group so that upon receipt at each station they do not interfere with one another. Next in process 730 a Clear to Send (CTS) CTS-to-Self packet is transmitted by the WAP to clear the contention based wireless communication medium for the upcoming concurrent transmission. Next in process 732 the packets for each of the concurrent links are each assembled including timing synchronizing preambles conforming with the IEEE 802.11 version supported by each receiving station in the group. When a legacy group includes, in addition to at least one legacy device, more than one station which does support the MU-MIMO protocol the packets may include a MU-MIMO frame for the MU-MIMO members of the group and one or more legacy packets. Control is then passed to process 734 for evaluation of the precode matrix "Q". In an embodiment of the invention the relative power of one link in the group is scaled relative to remaining links in the group. If throughput to remaining stations in the group is degraded as the power is scaled to one of the group, then the precoding matrix "Q" is deemed unreliable. A precoding matrix which is deemed unreliable is either re-determined or the group itself is disbanded in favor of another group of stations or a return to sequential communications with each station individually. Control is then passed to process 736 in which the entire packets to each link, including preamble and payload are precoded with the precode matrix "Q". Where the legacy group includes two or more MU-MIMO compliant members a MU-MIMO frame may be used provided the entire frame including the preamble is precoded, to avoid interference with the preamble(s) to the legacy members of the group.

Control is then passed to process 760 for transmission of the Legacy group of discrete concurrent communications to all members of the legacy group. The receiving stations all synchronize timing using the discrete precoded preambles of each packet without interference from other preambles in the group. Each then processes the associated precoded payloads without any interference from the payloads of the other packets in the group. Finally, receipt acknowledgment packets i.e. ACKs and block ACKS are used by the WAP to confirm a successful receipt of the transmitted data after which control returns to process 700.

The components and processes disclosed herein may be implemented a software, hardware, firmware, or a combination thereof, without departing from the scope of the Claimed Invention.

The foregoing description of a preferred embodiment of the invention has been presented for purposes of illustration and description. It is not intended to be exhaustive or to limit the invention to the precise forms disclosed. Obviously many modifications and variations will be apparent to practitioners skilled in this art. It is intended that the scope of the invention be defined by the following claims and their equivalents.

What is claimed is:

1. A wireless access point (WAP) apparatus having a plurality of antennas and supporting multiple-input multiple-output (MIMO) wireless communications with associated station nodes on a selected one of a plurality of orthogonal frequency division multiplexed (OFDM) communication channels; and the WAP apparatus comprising:
   a station grouping module configured to select a group of at least two of the associated station nodes for concurrent MIMO communication links with the WAP;
   a transmit selector configured to determine whether all station nodes in the group support a multi-user (MU) protocol;
   a spatial mapper including an input and an output, configured to precode concurrent transmissions to the selected group at the input using a precode matrix "Q" which spatially separates the concurrent MIMO transmissions to each station node in the group at the output;
   an output injector coupled to the output of the spatial mapper and configured to inject preambles for synchronizing timing of the MIMO transmissions at the output of the spatial mapper, responsive to an affirmative determination by the transmit selector; and
   an input injector coupled to the input of the spatial mapper and configured to inject preambles before precoding in the spatial mapper, responsive to a negative determination by the transmit selector, whereby transmission preambles are precoded when at least one station node in the group does not support the MU protocol.

2. The WAP apparatus of claim 1, further comprising:
   the output injector further configured to inject a single MU compliant preamble for each concurrent set of communication packets sent to the station nodes in the group; and
   the input injector further configured to inject into each concurrent set of communication packets a discrete preamble for each station node in the group that does not support the MU protocol.

3. The WAP apparatus of claim 1, further comprising:
   the output injector further configured to inject a single MU compliant preamble for each concurrent set of communication packets sent to the station nodes in the group; and
   the input injector further configured to inject into each concurrent set of communication packets, a discrete preamble for each station node in the group that does not support the MU protocol, wherein the discrete preambles match the selected one of the IEEE 802.11a, b, g, n, and ac 'Wave 1' standards supported by each station node.

4. The WAP apparatus of claim 1, further comprising:
   the station grouping module further configured to select a group of at least three of the associated station nodes at least two of which support the MU protocol and at least one of which does not support the MU protocol; and
   the input injector further configured to inject into each concurrent set of communication packets a single MU compliant preamble for the at least two of the station nodes in the group which support the MU protocol together with discrete preambles for remaining station nodes in the group.

5. The WAP apparatus of claim 1, further comprising:
   a channel probe configured to probe each station node in the group to determine the wireless channel information for each prospective link, including obtaining reverse channel estimates for stations that do not support explicit channel sounding.

6. The WAP apparatus of claim 1, further comprising:
   an evaluator configured to evaluate reliability of channel information between the WAP and station nodes that do not support explicit channel sounding, by comparing throughput to said station nodes with and without MIMO beamforming using a steering matrix derived from the channel information; whereby absent improvements in throughput resulting from MIMO beamforming the channel information is deemed unreliable.

7. The WAP apparatus of claim 1, further comprising:
   an evaluator configured to evaluate reliability of the precoding matrix "Q", by scaling the relative power of one link relative to remaining links in the group; whereby an unreliable precoding matrix results in degradation in throughput to the remaining links during scaling of relative power to the one link.

8. The WAP apparatus of claim 1, further comprising:
   the transmit selector further configured to determine whether all station nodes in the group support the multi-user (MU) protocol specified in IEEE 802.11ac 'Wave 2'.

9. A method for operating a wireless access point (WAP) apparatus having a plurality of antennas and supporting a multiple-input multiple-output (MIMO) wireless local area network (WLAN) with associated station nodes on a selected one of a plurality of orthogonal frequency division multiplexed (OFDM) communication channels; and the method comprising the acts of:
   selecting a group of at least two of the station nodes for concurrent wireless MIMO communication links with the WAP;
   determining whether all station nodes in the selected group support a multi-user (MU) protocol;
      inserting a single MU compliant preamble for a set of concurrent communication packets transmitted to the station nodes in the selected group, responsive to a determination that all station nodes in the group support the MU protocol; and
      inserting into the set of concurrent communication packets transmitted to station nodes in the selected group, a discrete preamble for the communication packet to each station node in the selected group that does not support the MU protocol, responsive to a determination that a station node in the group does not support the MU protocol;
   determining a precode matrix "Q" for precoding transmissions over the plurality of antenna which spatially separates the concurrent MIMO transmissions to each station node in the group;
   spatially mapping concurrent transmissions to the selected group using the precode matrix "Q" to precode the set of concurrent communication packets except for the single MU compliant preamble thereof, responsive to the determination that all station nodes in the selected group support the MU protocol, whereby the MU compliant preamble is 'heard' by all station nodes in the selected group; and spatially mapping concurrent transmissions to the selected group using the precode matrix "Q" to precode the set of concurrent communication packets including the discrete preambles thereof, responsive to the determination that a station node in the group does not support the MU protocol; thereby transforming the discrete preambles into spatially separate transmissions which avoid interference with one another.

10. The method for operating a WAP of claim 9, wherein the discrete preambles match a corresponding one of the IEEE 802.11a,b,g,n, and ac 'Wave 1' standards supported by each station node.

11. The method for operating a WAP of claim 9, further comprising:
selecting, in the selecting act, a group of at least three of the station nodes at least two of which support the MU protocol and at least one of which does not support the MU protocol; and
inserting, into the set of communication packets a single MU compliant preamble for the communication packets to the at least two of the station nodes in the group which support the MU protocol together with the discrete preamble for the communication packet to the at least one station node in the group that does not support the MU protocol.

12. The method for operating a WAP of claim 9, further comprising:
probing each station node in the group to determine the wireless channel information for each prospective link, including obtaining reverse channel estimates for station nodes that do not support explicit channel sounding; and
determining the precode matrix "Q" based on the wireless channel information for each prospective link obtained in the probing act.

13. The method for operating a WAP of claim 9, further comprising:
evaluating reliability of channel information between the WAP and station nodes that do not support explicit channel sounding, by comparing throughput to said station nodes with and without MIMO beamforming using a steering matrix derived from the channel information; whereby absent improvements in throughput resulting from MIMO beamforming the channel information is deemed unreliable.

14. The method for operating a WAP of claim 9, further comprising:
evaluating reliability of the precoding matrix "Q", by scaling the relative power of one link relative to remaining links in the group; whereby an unreliable precoding matrix results in degradation in throughput to the remaining links during scaling of relative power to the one link.

15. The method for operating a WAP of claim 9, wherein the determining act further comprises:
determining whether all station nodes in the group support the MU protocol specified in IEEE 802.11ac 'Wave 2'.

16. The method for operating a WAP of claim 9, further comprising:
transmitting a "CTS-to-SELF" packet prior to transmission of the set of concurrent communication packets where the selected group includes at least one station node that does not support the MU protocol, thereby controlling access by the station nodes to the selected one of the plurality of communication channels.

17. The method for operating a WAP of claim 9, further comprising:
varying a communication bandwidth of each communication racket in a set of concurrent communication packets, where the selected group includes at least one station node that does not support the MU protocol, thereby matching bandwidth with each station node's capabilities.

* * * * *